(12) United States Patent
Mast, Jr.

(10) Patent No.: US 9,331,608 B2
(45) Date of Patent: May 3, 2016

(54) ACTUATOR CONTROL CIRCUIT

(71) Applicant: Columbus McKinnon Corporation, Amherst, NY (US)

(72) Inventor: Daniel A. Mast, Jr., Rock Hill, SC (US)

(73) Assignee: Columbus McKinnon Corporation, Getzville, NY (US)

( * ) Notice: Subject to any disclaimer, the term of this patent is extended or adjusted under 35 U.S.C. 154(b) by 222 days.

(21) Appl. No.: 14/350,175

(22) PCT Filed: Oct. 8, 2012

(86) PCT No.: PCT/US2012/059218
§ 371 (c)(1),
(2) Date: Apr. 7, 2014

(87) PCT Pub. No.: WO2013/052945
PCT Pub. Date: Apr. 11, 2013

(65) Prior Publication Data
US 2014/0285132 A1    Sep. 25, 2014

Related U.S. Application Data

(60) Provisional application No. 61/545,125, filed on Oct. 8, 2011.

(51) Int. Cl.
*G05G 5/00* (2006.01)
*H02P 3/04* (2006.01)
*H02P 3/02* (2006.01)
*G05B 19/414* (2006.01)

(52) U.S. Cl.
CPC ............... *H02P 3/04* (2013.01); *G05B 19/414* (2013.01); *H02P 3/025* (2013.01); *G05B 2219/34189* (2013.01); *G05B 2219/36463* (2013.01)

(58) Field of Classification Search
CPC ............................. H02P 3/04; H02P 3/025
USPC .................................................. 318/626
See application file for complete search history.

(56) References Cited

U.S. PATENT DOCUMENTS

| 6,401,021 | B1 * | 6/2002 | Scally | B60N 2/0248 296/65.01 |
|---|---|---|---|---|
| 2005/0194554 | A1 * | 9/2005 | Seberger | G05B 19/058 251/129.04 |
| 2008/0109833 | A1 * | 5/2008 | Hung | G11B 17/056 720/606 |
| 2014/0152201 | A1 * | 6/2014 | Shriver | B64C 13/50 318/376 |

* cited by examiner

*Primary Examiner* — Erick Glass
(74) *Attorney, Agent, or Firm* — Phillips Lytle LLP

(57) ABSTRACT

An actuator comprising a single actuator housing containing within it a motor, a controller, a memory, and a position sensor having an output, a user interface for causing a first threshold value to be stored in the memory, and the controller configured and arranged to stop the motor as a function of the position sensor output and the first threshold value.

28 Claims, 7 Drawing Sheets

ACTUATOR CONTROL CIRCUIT

TECHNICAL FIELD

The present invention relates generally to the field of actuators, and more specifically to the field of actuator control systems.

BRIEF SUMMARY OF THE INVENTION

The disclosed embodiments provide all in one actuators with programmable internal boundary limits for limiting the actuator position. Additionally, the disclosed embodiments provide methods of controlling an actuator with the ability to set internal thresholds for limiting actuator movement.

With parenthetical reference to the corresponding parts portions or surfaces of the disclosed embodiment, merely for the purposes of illustration and not by way of limitation, an actuator system (110, 220, 310) is provided comprising a single actuator housing (120, 220, 320) containing within it a motor (131, 231, 331), a controller (122, 222, 322), a memory (125, 225, 325), and a position sensor (123, 223, 323) having an output (124, 324), a user interface (130, 330) for causing a first threshold value (126, 326) to be stored in the memory, and said controller is configured and arranged to stop the motor as a function of the position sensor output and the first threshold value.

The user interface may have a first threshold set switch (114, 214, 314), and the controller may be configured and arranged to store a measured first threshold (126) into the memory (125) as a function of the first threshold switch, in which the measured threshold may have a magnitude that is a function of the position sensor output. The user interface may have a second threshold set switch (224), the controller may be configured and arranged store a second measured threshold (327) into the memory, and the controller may be configured to stop the motor as a function of the position sensor output, the first threshold value, and the second threshold value. The first threshold may be a forward limit threshold, and the second threshold may be a reverse limit threshold. The threshold set switch (314) may have multiple states or positions, and the states may include a first threshold set state, a second threshold set state, and/or a normal operation state.

The user interface may have an indicator (117, 217, 317), and the indicator may be a light, and/or audio alarm. The position sensor may be connected to a motor transmission (337). The motor may be a permanent split capacitor motor, a permanent magnet DC motor, a synchronous motor, a stepper motor, a variable reluctance motor, or other similar motor. The actuator housing may also contain within it a motor driver (132, 212, 332). The motor driver may contain a thyristor (321, 322), a transistor, an IGBT, or other similar device.

The actuator system may have a safety circuit (365) to verify that the controller is operational before the motor driver can be engaged. The actuator housing may further comprise a brake. The brake may be a fail safe brake comprising a spring, and/or the brake may be configured and arranged to brake the motor in the absence of power delivered to the brake. The controller may be configured and arranged to cause the brake to brake the motor as a function of the position sensor output and the first threshold value. The brake may be configured and arranged such that regenerative power from the motor is not transferred to the brake.

The actuator system may further comprise a plurality of soft thresholds in the memory, and the controller may be configured and arranged to temporarily stop the motor when the position sensor output equals one of the soft thresholds. The actuator may have an output terminal for providing an output signal external to the housing, and the output signal may be a function of the position sensor output. The user interface may have an input terminal for receiving a manually entered threshold, and the manually entered threshold may be entered from a programmer separate from the user interface.

In another aspect, disclosed is a method of controlling an actuator comprising the steps of providing (521, 621) an actuator having a single actuator housing containing within it a motor, a controller, a memory, a position sensor having an output, and a user interface for causing a first threshold value to be stored in the memory, receiving (527, 627) a signal over the user interface, storing (531, 631) a threshold value in the memory, reading (535, 635) a position sensor output, calculating (539, 639) a current position value, where the position value is a function of the position sensor output, and preventing (543, 643) the motor from moving as a function of the current position value and the threshold value stored in the memory. The step of preventing a motor from moving may comprise the step of stopping the motor when the current position value is greater than the first threshold. The method may further include the step of storing (632) a second threshold value in the memory, and the step of preventing (643) a motor from moving may include the step of stopping the motor when the current position value is greater than the first threshold or less than the second threshold. The method may further include the step of setting the threshold value with an external programmer.

The user interface may include a switch having a current state, where the current state may be one state out of a set of multiple possible states, and the step of receiving a signal may include the step of sensing a change in the current state. The step of storing a threshold value may include the steps of calculating a current position value that is a function of the position sensor output, and storing the current position value into the memory.

The actuator housing may further contain within it a brake, and the brake may be configured and arranged to prevent the motor from moving when the brake does not receive electrical power, and the brake may allow the motor to move when the brake receives electrical power. The method may further include the step of providing the brake an electrical power for disengaging the brake as a function of the current position value and the threshold value stored in the memory. The step of preventing the motor from moving may include the step of cutting (645) the electrical power for disengaging the brake.

In another aspect, the disclosed embodiments provide an actuator control circuit (200, 410) having a logic controller (122, 222, 322), a first threshold set button (114, 214, 314), a position sensor (123, 223, 323), and a first threshold switch (221). The logic controller (122, 222, 322) may be a microcontroller, microprocessor, PLD, FPGA, or other similar device. The control circuit may also have a memory element, such as a flash memory chip, or memory may be provided on the logic controller (222). The position sensor (123, 223, 323) may be a potentiometer, encoder, resolver, variable differential transformer, a multi-turn potentiometer, or other similar device. The first threshold switch (221) may be a relay, a FET, an IGBT, a thyristor, or other similar device. The control circuit may also include a power supply (311). The power supply may include an AC to DC converter.

The logic controller may be configured to store the position sensor reading in a first threshold when the first threshold set button is pressed. The logic controller may further be configured to set the first threshold switch when the position sensor's reading is greater than the first threshold and reset the first threshold switch (221) otherwise.

The control circuit may include a second threshold set button (224) and/or a second threshold switch (216). The logic controller may be configured to store the reading from the position sensor into a second threshold when the second threshold button is pressed. The logic controller may further be configured to set the second threshold switch when the position sensor's reading is less than the first threshold and reset the first threshold switch otherwise.

The control circuit may include an indicator LED (217). The indicator LED may be configured to be turned on when control circuit receives power. The indicator LED may further be configured to flash in a first pattern when the first threshold is set and/or in a second pattern when the second threshold is set.

The control circuit may also include an analog input for setting a threshold and/or an analog output to provide actuator position information. The control circuit may contain peer to peer communication circuitry, or control lines for controlling an actuator motor.

The motor may be a linear motor or a rotary motor. The position sensor may be coupled to a worm gear. The position sensor may be coupled to a transmission.

DETAILED DESCRIPTION OF THE PREFERRED EMBODIMENTS

Figure 1:
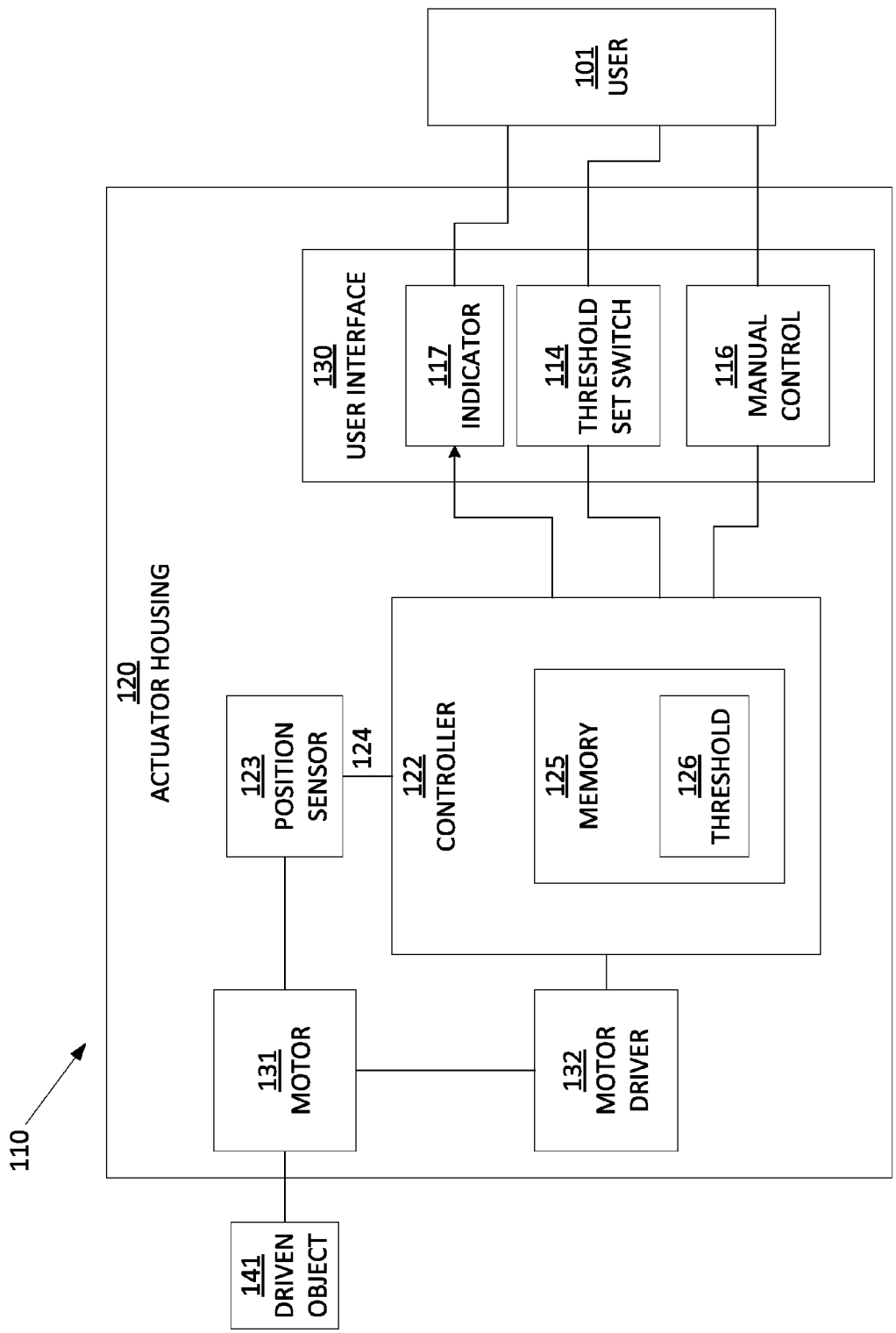
FIG. 1 is an object diagram of a first embodiment of an actuator control circuit.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIG. 1 thereof, disclosed is an actuator, a general embodiment of which is generally indicated at 110. As shown, actuator 110 generally includes actuator housing 120, motor 131, motor driver 132, position sensor 123, controller 122, and user interface 130. Actuator 110 is positioned to drive driven object 141, while also interacting with user 101. Arranged within actuator housing 120 are motor 131, motor driver 132, position sensor 123, controller 122, and user interface 130. Actuator housing 120 is generally a single housing, and may be comprised of a monolithic, or unitary piece of material. Actuator housing 120 may be a line replaceable unit, holding each of its components in a single protected volume.

In general operation of actuator 110, position sensor 123 provides controller 122 with the position of motor 131. Motor driver 132 provides operating power to motor 131 as controlled by controller 122. User interface 130 allows user 101 to program controller 122 with a positional threshold, such that controller 132 is configured to prevent motor 131 from exceeding the programmed positional threshold.

Motor 131 may be an electric rotary motor, or linear motor. Motor 131 may be a permanent magnet motor, DC motor, AC motor, synchronous motor, variable reluctance motor, a stepper motor, a permanent split capacitor motor, or any other similar motor. Motor 131 is coupled to driven object 141. Motor 131 may be directly coupled to driven object 141, or may be coupled through a transmission, mechanical linkage, gear system, or other similar coupling.

Position sensor 123 is arranged to measure the position of motor 131. Position sensor 123 may be coupled directly to motor 131, or alternatively to a mechanical linkage coupled to motor 131. Position sensor 123 may be a potentiometer, encoder, resolver, variable differential transformer, a multi-turn potentiometer, or other similar device. Position sensor 123 has output 124 which is provided to controller 122. Position sensor output 124 may be an analog or digital signal. Controller 122 is configured to read output 124, and may be configured to periodically sample output 124. Controller 122 may include an analog to digital converter to read output 124.

Controller 122 is a logic device. Controller 122 may be a PLD, FPGA, microchip, or other similar device. Controller 122 is configured and arranged to read memory 125. Memory 125 may be an independent flash memory chip, memory residing on controller 122, or some other form of non volatile memory. Controller 122 is arranged to operate a program or algorithm. The specific implementation of such program or algorithm may be implemented within the logic of controller 122 if controller 122 is a programmable logic device such as a gate array or FPGA. Alternatively, the program or algorithm may be implemented as program instructions stored in memory 122. A portion of memory 122 is arranged to store threshold value 126. Controller 122 is connected to user interface 130 in order to send and receive information to and from user interface 130.

User interface 130 contains threshold set switch 114, manual control 116, and indicator 117. Manual control 116 provides user 101 with an interface for controlling motor 131. Manual control 116 may contain a button for allowing user 101 to cause motor 131 to move forward, and a button for allowing a user 131 to cause motor 131 to move reverse. Alternatively, manual control may be a rocker switch, a digital joystick, an analog joystick, or other similar device. Threshold set switch 114 may include a button, slide switch, rotation switch, magnetically activated switch, or other similar switch which allows user 101 to send a signal to controller 122. Controller 122 is configured to read threshold set switch 114 and manual control 116. Controller 122 may read threshold switch 114 and manual control 116 through an interrupt driven input, through periodic sampling, or through other similar information transmission techniques.

Figure 7:
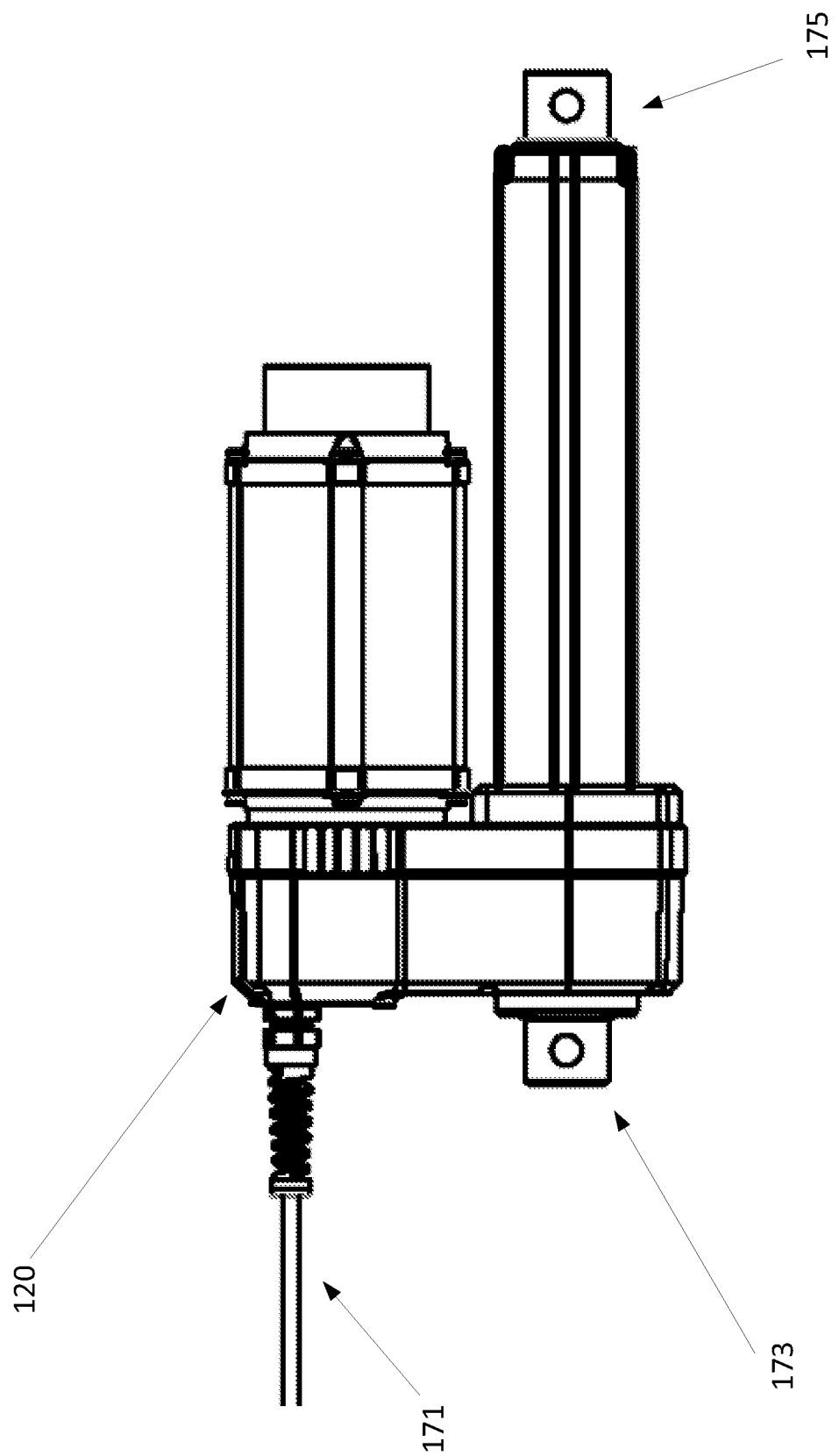
FIG. 7 is a side view of an actuator housing of the embodiment shown in FIG. 1.

FIG. 7 is a side view of actuator housing 120. Cable 171 provides an electrical conduit for passing electrical wires and signals into and out of housing 120. Attached to housing 120 is mount 173, for mounting the actuator onto a surface. Additionally, coupling 175 provides a mechanism for coupling the actuator to a driven object.

Figure 5:
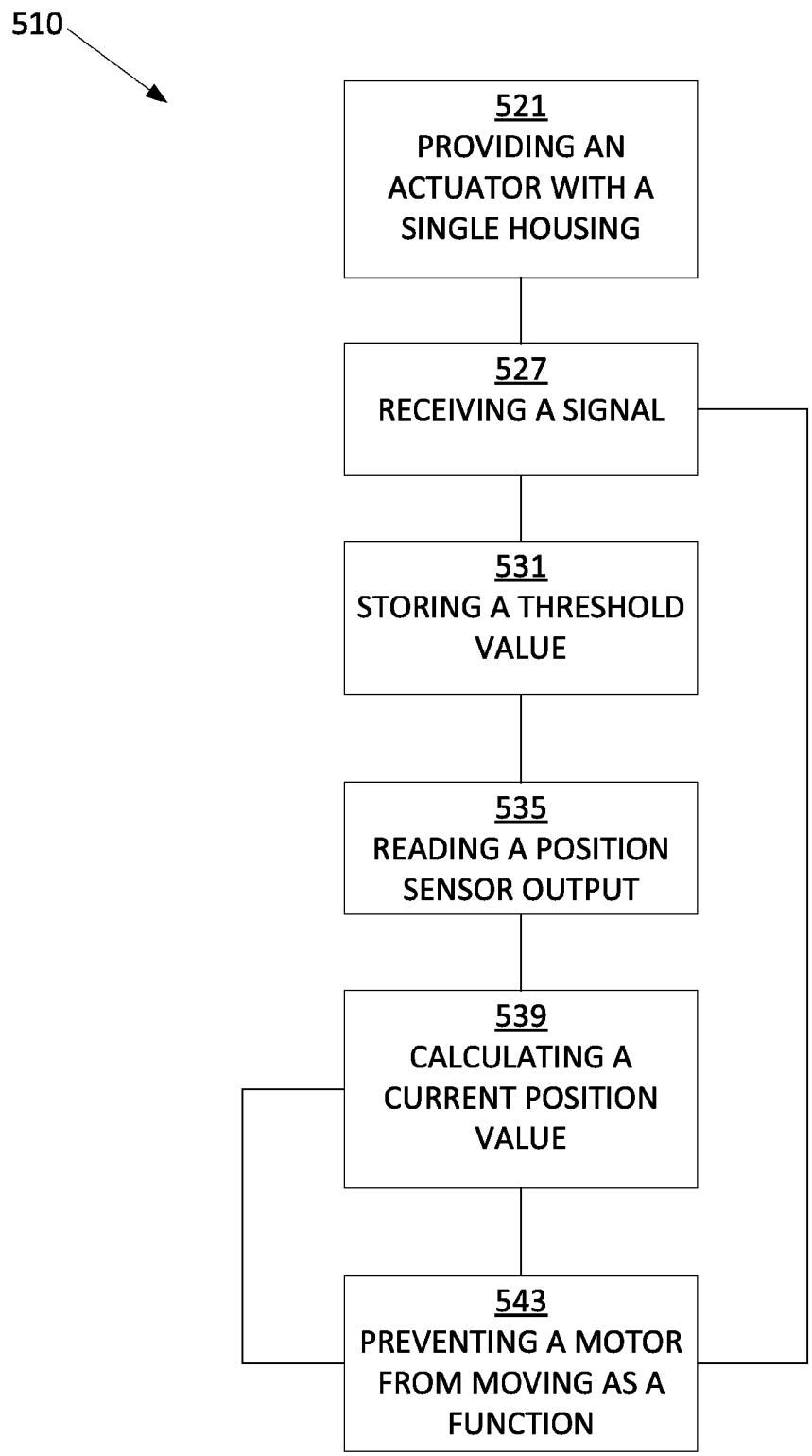
FIG. 5. is a flow chart for a first embodiment of a method of controlling an actuator.

FIG. 5 provides a flow chart of the general method of operation 510 of operating actuator 110. As a first step, an instance of actuator 110 is provided 521. The actuator is then powered up. The very first time actuator 110 is turned on, memory 125 will either contain a null value in threshold 126 (which indicates to controller 122 that the threshold has not been programmed) or threshold 126 will have been preloaded with a maximum possible value the threshold. This initial value in threshold 126 prevents the algorithm on controller 122 from restricting the range of motion of motor 131.

The next step involves setting threshold 126. As the first step in setting threshold 126, user 101, presses threshold set switch 114, which is received 527 and detected by controller 122, and causes actuator 110 to enter a threshold set mode. When threshold set mode is entered, controller 122 causes indicator 117 to output a threshold set mode signal. More specifically, indicator 117 will output a flashing red light during threshold set mode. In the threshold set mode, controller 122 will follow commands from manual control 116 without regard to the value in threshold 126. User 101 uses manual control 116 to move motor 131 into a position which defines a boundary or absolute limit for which the threshold will be programmed. Manual control 116 allows user 101 to initiate a move forward command, or a move backward command. Controller 116 reads and interprets user 101's manipulation of manual control 116 and directs motor driver 132 to drive motor 131 as commanded by user 101. More specifically, a forward move command from manual control 116 will cause controller 122 to cause driver 132 to drive motor 131 forward, and a reverse move command from manual control 116 will cause controller 122 to cause driver 132 to drive motor 131 reverse. When motor 131 reaches the desired boundary position, user 101 then releases manual control 116, and presses threshold set switch 114 a second time. Controller 122 detects the pressing of threshold set switch 114 and causes position sensor 123's output 124 to be read and stored 531 into memory 125 as threshold 126. After storing position sensor output 124 into threshold 126, controller 122 changes its state from threshold set mode to normal operation mode. In normal operation mode, controller 122 will cause indicator 117 to stop outputting the threshold set mode signal; in other words, indicator 117 will stop flashing red. With a valid threshold now stored in threshold 126, the normal operation mode algorithm on controller 122 will now prevent motor 131 from being driven past the boundary position defined by threshold 126. More specifically, when controller 122 receives a forward move command from manual control 116, controller 122 reads 535 position sensor output 124, and calculates 539 a current position as a function of the current sensor output. The calculation may be a mere scaling of the position sensor output 124 into units of length, or more be a more complex function to account for non-linearities in the position sensor output 124. Controller 122, then prevents 543 motor 131 from moving if the current position value is greater than threshold 126. If position sensor output 124 is greater than threshold 126, motor driver 132 will not be commanded to drive motor 131. Only if position sensor output 124 is less than threshold 126, will controller 122 allow a manual control 116 forward move command to cause motor driver 132 to drive motor 131 forward.

If user 101 decides to change threshold 126, user 101 again presses threshold set switch 114, which causes actuator 110 to again enter threshold set mode as defined above.

Figure 2:
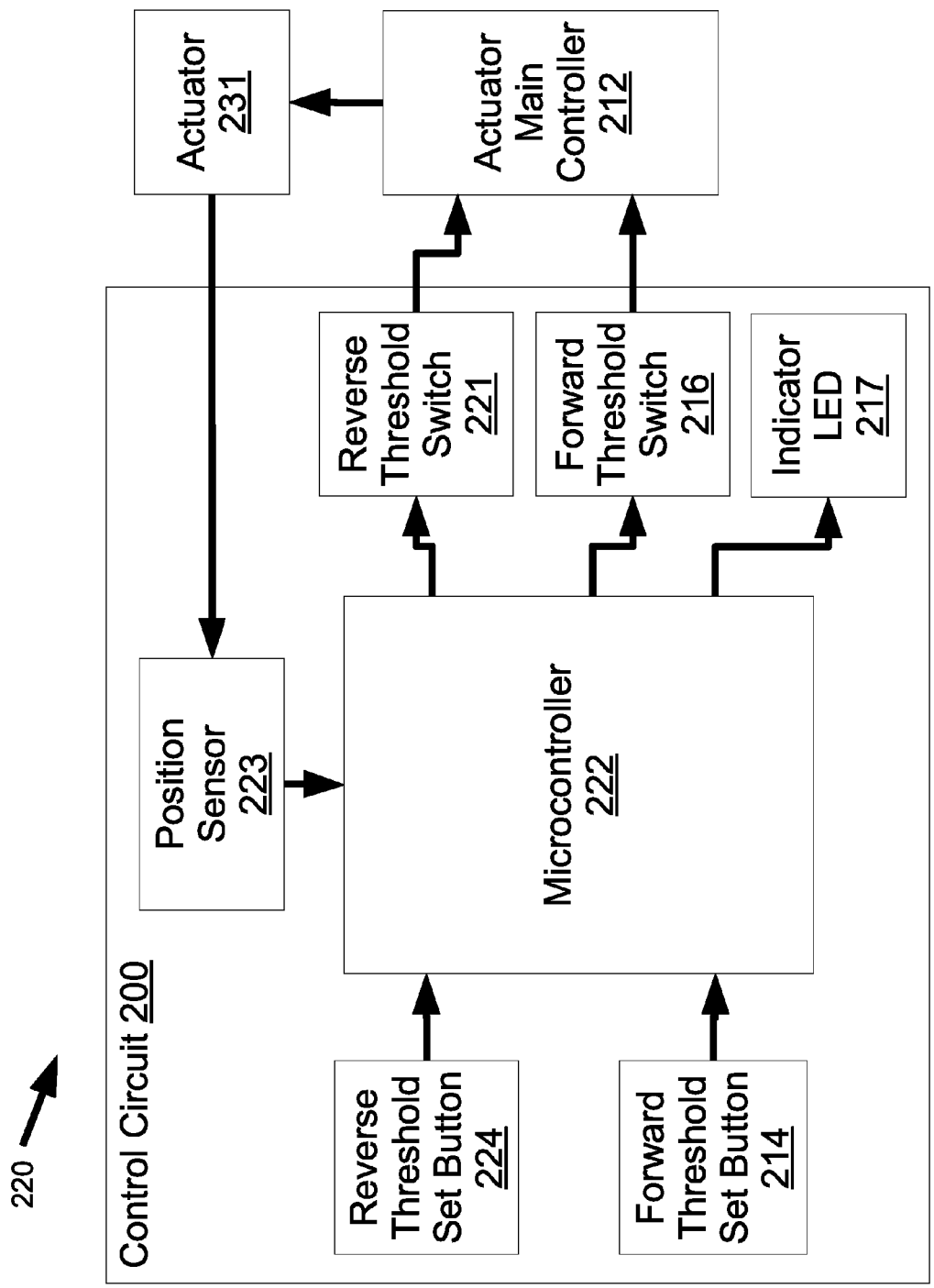
FIG. 2 is an object diagram of a second embodiment of an actuator control circuit.

FIG. 2 is an object diagram of a second embodiment, which is generally indicated at 220. As shown in FIG. 2, actuator control circuit 200 is typically used in a system that generally includes actuator 231 and actuator main controller 212. In the system shown in FIG. 2, actuator 231 is a linear actuator having a rotary drive screw. However, actuator 231 could be a rotary actuator or any other similar type of actuator. Actuator main controller 212 provides the drive lines to actuator 231 which control actuator 231. Actuator main controller 212 may also include a user interface for allowing a user to command actuator 231 to move forward or reverse (retract or extend).

As shown, control circuit 200 generally includes microcontroller 222, position sensor 223, reverse threshold set button 224, forward threshold set button 214, reverse threshold switch 221, forward threshold switch 216, and indicator LED 217. Control circuit 200 generally allows a user to set a forward threshold for a given extension length such that the forward threshold switch will be set whenever actuator 231 is extended beyond the forward threshold set. Similarly, control circuit 200 allows a user to set a reverse threshold for a given actuator extension length (retraction length) such that the reverse threshold switch will be set whenever the actuator extension length is refracted past the reverse threshold. Input to control circuit 200 comes from reverse threshold set button 224 and forward threshold set button 214, as well as position sensor 223. The outputs of control circuit 200 are the states of reverse threshold switch 221 and forward threshold switch 216, as well as the state of indicator LED 217.

Reverse threshold set button 224 and forward threshold set button 214 are digital pushbuttons connected to digital input pins on microcontroller 222. Microcontroller 222 is a Microchip Technologies PIC 224 microcontroller. However, alternative logic control devices could be used for microcontroller 222, such as a PLD, FPGA, microchip, or other similar device. Microcontroller 222 has an analog input pin which is connected to position sensor 223. Microcontroller 222 has an internal analog to digital converter for reading the voltage on its analog input pin. Position sensor 223 is a rotary potentiometer. Position sensor 223 is arranged and configured to provide an analog output signal to microcontroller 222 having a magnitude which is generally proportional to the angle of rotation of the potentiometer shaft. By reading the magnitude of the potentiometer output, microcontroller 222 can determine the angle of rotation of the potentiometer. Position sensor 222 alternatively may be an encoder, a resolver, a variable transformer, or other similar device. Position sensor 223 is coupled to actuator 231's transmission. Actuator 231 is a linear actuator having a rotary drive screw transmission. Position sensor 223's potentiometer shaft is coupled to actuator 231's drive screw through a worm gear. Actuator 231 may be any other type of actuator, and position sensor 223 can be configured to sense the position of any member which moves in or with actuator 231.

Microcontroller 222 contains digital outputs connected to reverse threshold switch 221, forward threshold switch 216, and indicator LED 217. Threshold switches 221 and 226 are typical relays having two solenoid inputs and two output terminals. The two output terminals are not electrically connected when no current is flowing through the relay solenoid inputs. However, when a current is passed through a relays solenoid inputs, the two output terminals are electrically connected. The relay outputs are electrically isolated from the relay inputs. Microcontroller 222 is configured to be able to control switches 221 and 216 through microcontroller 222's digital outputs. Instead of relays, switches 221 and 216 could be implemented as FETs, IGBTs, or other similar devices.

Microcontroller 222 contains an internal memory. A first memory location is reserved for a reverse threshold value, and a second memory location is reserved for a forward threshold value. A third memory location is reserved for an operating program. The operating program is configured to operate microcontroller 222 as follows.

Whenever reverse threshold set button 224 is set (pressed by a user 101), the position reading from sensor 223 is stored into the reverse threshold memory location. Similarly, whenever forward threshold set button 214 is set (pressed by a user) the reading from position sensor 223 is stored in the forward threshold memory location.

During normal operation, microcontroller 223 is continually comparing the reading from position sensor 223 to both the reverse threshold value and the forward threshold value stored in memory. When the reading from position sensor 223 is less than the reverse threshold, reverse threshold switch 221 is set (the relay output terminals are connected). When the reading from position sensor 223 is greater than the reverse threshold, reverse threshold switch 221 is reset (the relay output terminals are disconnected).

Alternatively, when the reading from position sensor 223 is greater than the forward threshold, forward threshold switch 216 is set (relay output terminals are connected). When the reading from position sensor 223 is less than the forward threshold, forward threshold switch 216 is reset (relay output terminals are disconnected).

The state of switches 221 and 216 are read by actuator main controller 212. An actuator user is alerted whenever actuator 231's position reaches either the forward or reverse thresholds. Actuator main controller 212 may automatically prevent the actuation of actuator 231 extending past the forward threshold or retracted past the reverse threshold.

Indicator LED is steady on when control circuit 200 is receiving power. However, when either the reverse or forward thresholds are set, LED 217 is blinked in a pattern. The blink pattern may be different for when the reverse threshold is set vs. the forward threshold being set.

Figure 3:
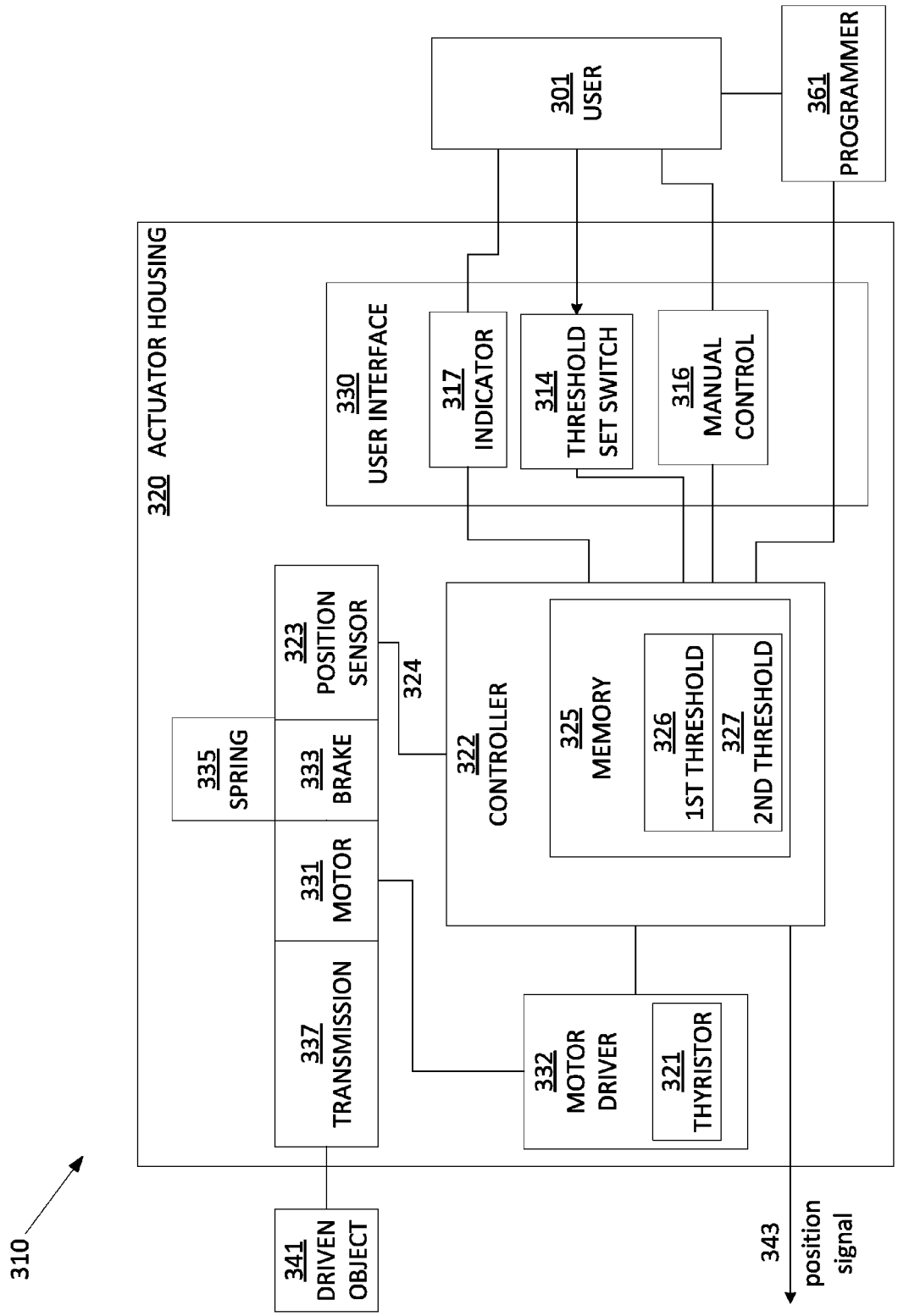
FIG. 3 is an object diagram of a third embodiment of an actuator control circuit.

FIG. 3 is a block diagram of a third form actuator, generally shown at 310. Actuator 310 is very similar to actuator 110, with several additional elements added. Like actuator housing 120, actuator housing 320 contains within it motor 331, motor driver 332, controller 322, memory 325, position sensor 323, and user interface 330. User interface 330 contains threshold set switch 314, manual control 316, and indicator 317. Memory 325 contains first threshold 326.

Actuator housing 320 contains the new elements of brake 333, spring 335, and transmission 337. Additionally, motor driver 332 includes thyristor 321, and memory 325 includes second threshold 327. Actuator 310 also includes external programmer 361.

Threshold set switch 314 is different than actuator 110's threshold set switch 114, in that threshold set switch 314 is a rotary dial select switch having three states. Switch 314's states include a set first threshold state, set second threshold state, and normal operation state.

Brake 333 is coupled to spring 335. Spring 335 is arranged in a compressed form to cause brake 333 to brake motor 331 in the absence of power. When power is applied to brake 333, brake 333 releases motor 331. Brake 333 acts as a fail safe, ensuring that when power is lost, driven object 341 will be held stationary. Brake 333 also allows controller 322 to actively brake motor 331. Transmission 337 is a mechanical linkage between motor 331 and driven object 341. More specifically, transmission 337 is a worm gear drive. Transmission 337 provides a mechanical advantage between the motor and movement of driven object 341.

Figure 6:
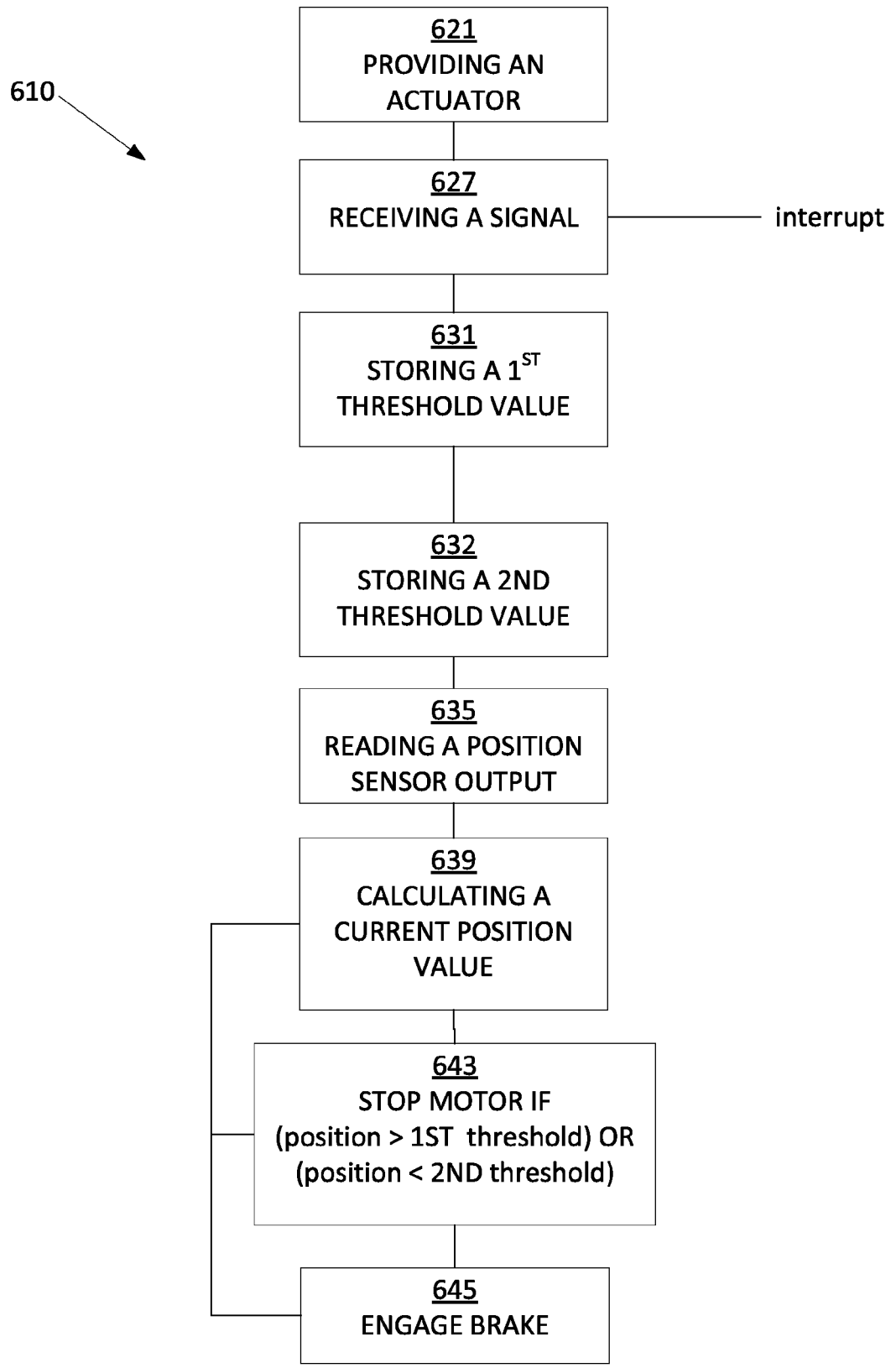
FIG. 6 is a flow chart for a second embodiment of a method of controlling an actuator.

While the operation of actuator 310 is generally similar to method of operation 510 of actuator 110, there are some differences. FIG. 6 provides a flowchart of the general method 620 followed in operating actuator 310. Method 510 steps 521, 527, 531, 535, 539, and 543 are analogous to method 610 steps 621, 627, 631, 635, 639, and 643. Under normal operation, controller 322 is monitoring 635 position sensor 323 output 324 to make sure that not only is output 324 greater than first threshold 326, but that output 324 is also less than second threshold 327. More specifically, if output 324 is greater than first threshold 326, controller 322 will stop 643 motor 331 by ignoring move forward commands from manual control 316. Additionally, if output 324 is less than second threshold 327, controller 322 will ignore move reverse commands from manual control 316.

When a user 301 desires to change thresholds 326 or 327, user 301 may either use threshold set switch 314 or programmer 331. To use threshold set switch 314, user 301 rotates switch 314 to the desired mode. For example, to enter first threshold set mode, user 301 rotates switch 314 clockwise. Rotating switch 314 causes an interrupt signal to be received 627 by controller 322. User 301 then moves motor 331 into the desired boundary position. While in first threshold mode, controller 322 obeys manual control 316 without regard to first threshold 326. Position sensor output 324 is continually stored 631 in memory 325 as first threshold 326 when motor 331 is moved. Once driven object 341 and motor 331 are in the desired position, user 301 rotates switch 314 back to normal mode. Once back in normal mode, controller 322 resumes monitoring 635 position sensor 324 with respect to new first threshold 326 and second threshold 327, and selectively overrides 643 manual control 316 in order to keep position sensor output 324 within range of thresholds 326 and 327. Optionally, position sensor output 324 may be converted to a position value through calculating 639 a conversion function before storing 631 a new threshold or comparing 643 the position value with a stored threshold.

User 301 may also use programmer 331 to directly program thresholds 326 or 327. User 301 first connects programmer 331 to controller 322. Such a connection may be through a direct wire link, such as an RS 232 serial line, or other similar direct link, or may alternatively be through a wireless connection, such as a blue tooth connection or other similar wireless connection type. Controller 322 acknowledges the link with programmer 331. User 301 then proceeds to manually enter threshold values into programmer 331. For example, user 301 may type onto a keypad on programmer 331. Programmer 331 then transmits these new threshold values into to controller 322, which stores the threshold values into memory 325 as thresholds 326 and 327. Actuator 310 also provides position signal 343 outside of actuator housing 320. Position signal 343 is a function of position sensor output 324, and may be used by a higher level feedback mechanism or controller.

Figure 4:
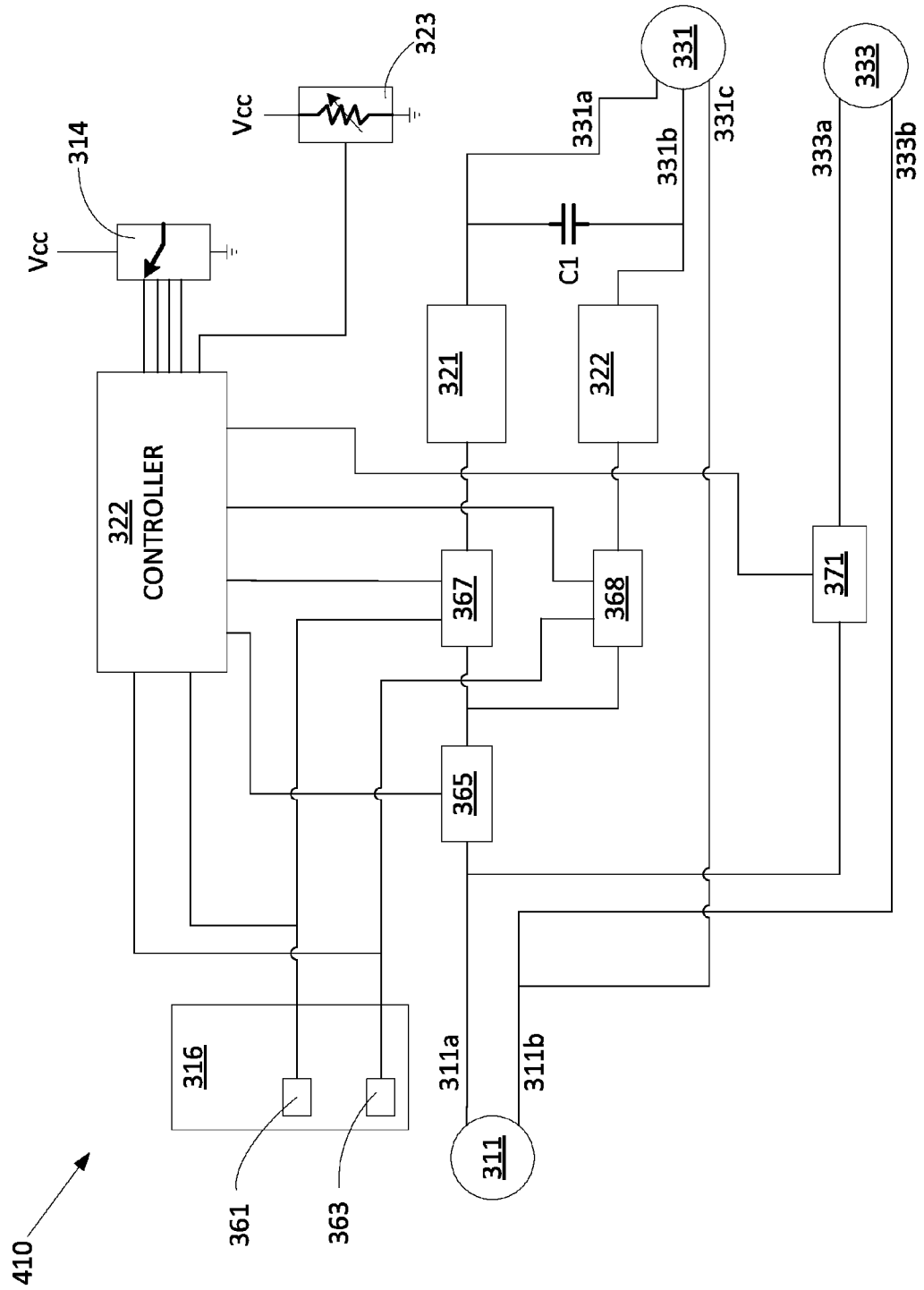
FIG. 4 is a circuit schematic for the embodiment shown in FIG. 3.

FIG. 4 provides a circuit schematic of circuit hardware implementation 410 of actuator 310. As shown in FIG. 4, AC power supply 311 has hot line 311a and neutral line 311b. Neutral line 311b connects to terminal 331c of motor 331, and terminal 333b of brake 333. Hot line 311a is connected to both switches 365 and 371, which are both gated by separate lines from controller 322. Switch 365 acts as a fail safe which prevents power from reaching the motor driver unless the controller is operational. More specifically, the gate signal to switch 365 is a logic signal that signifies controller 322 is receiving power and is operational. Switch 371 is connected to terminal 333a of brake 333. When switch 371 is turned on, and power is allowed to reach brake 333, brake 333 is disengaged, and allows motor 331 to move.

Power from switch 365 is provided to switch circuits 367 and 368. Switch circuits 367 and 368 are basically switches which are gated by two control lines, one control line from controller 322, and one control line from manual control 316. More specifically, switch 367 receives one control from forward button 361 on manual control 316 and a second control from controller 322. In order for switch 367 to pass power on, both controller 322 and forward button 361 need to be logic true. When both signals are logic true, switch 367 passes power onto thyristor 321, which is connected to terminal 331a of motor 331. Similarly, switch 368 is gated by reverse button 363 on manual control 316, as well as by controller 322. When switch 368 receives two logic true signals on its control inputs, it forwards power to thyristor 322, which is connected to terminal 331b of motor 331. Capacitor C1 is arranged between terminals 331a and 331b.

Position sensor 323 is a variable potentiometer connected between Vcc and ground, which is then read by an analog to digital converter in controller 322. Switch 314 is a four pole dial switch, each output of which is read by controller 322. Each of switch 314's outputs may be connected to a separate digital input pin of controller 322. Alternatively, each of 314's outputs may be connected to a separate voltage dividers of differing magnitude such that all four of 314's outputs may be read by a single analog input on controller 322.

Various other alternative embodiments of the disclosed control circuit are possible. For example, control lines for controlling of an actuator motor and/or brake may be added to the control circuit. Additionally, an analog output indicating the actuator position may also be added. Similarly, an analog input may be added for setting a threshold. Peer to peer communication may further be added to the control circuit.

Therefore, while the presently-preferred form of the actuator control circuit has been shown and described, and several modifications discussed, persons skilled in this art will readily appreciate that various additional changes may be made without departing from the scope of the invention.

The invention claimed is:

1. An actuator comprising:
   a single actuator housing containing within it a motor, a controller, a memory, and a position sensor having an output;
   a user interface for causing a first threshold value to be stored in said memory; and
   said controller configured and arranged to stop said motor as a function of said position sensor output and said first threshold value.

2. The actuator as set forth in claim 1, wherein said user interface comprises a first threshold set switch, and wherein said controller is configured and arranged to store a measured first threshold into said memory as a function of said first threshold switch, said measured threshold having a magnitude that is a function of said position sensor output.

3. The actuator as set forth in claim 2, wherein
   said user interface further comprises a second threshold set switch,
   said controller is configured and arranged store a second measured threshold into said memory, and
   said controller is configured to stop said motor as a function of said position sensor output, said first threshold value, and said second threshold value.

4. The actuator as set forth in claim 3, wherein said first threshold is a forward limit threshold, and said second threshold is a reverse limit threshold.

5. The actuator as set forth in claim 3, wherein said first threshold set switch comprises a first threshold set position, a second threshold set position, and a normal operation position.

6. The actuator as set forth in claim 1, wherein said user interface comprises an indicator.

7. The actuator as set forth in claim 6, wherein said indicator is a light or an audio alarm.

8. The actuator as set forth in claim 1, wherein said position sensor is connected to a motor transmission.

9. The actuator as set forth in claim 1, wherein said motor is a permanent split capacitor motor.

10. The actuator as set forth in claim 1, and further comprising a motor driver within said housing.

11. The actuator as set forth in claim 10, wherein said motor driver comprises a thyristor.

12. The actuator as set forth in claim 10, and further comprising a safety circuit configured and arranged to verify that the controller is operational before the motor driver can be engaged.

13. The actuator as set forth in claim 1, and further comprising a brake.

14. The actuator as set forth in claim 13, wherein said brake is a fail safe brake comprising a spring, and wherein said brake is configured and arranged to brake said motor in the absence of power.

15. The actuator as set forth in claim 13, wherein said controller is configured and arranged to cause said brake to brake said motor as a function of said position sensor output and said first threshold value.

16. The actuator as set forth in claim 13, wherein said brake is configured and arranged such that regenerative power from said motor is not transferred to said brake.

17. The actuator as set forth in claim 1, and further comprising a plurality of soft thresholds in said memory, and wherein said controller is configured and arranged to temporarily stop said motor when said position sensor output equals one of said soft thresholds.

18. The actuator as set forth in claim 1, and further comprising an output terminal for providing an output signal external to said housing, said output signal being a function of said position sensor output.

19. The actuator as set forth in claim 1, wherein said user interface comprises an input terminal for receiving a manually entered threshold.

20. The method of controlling an actuator comprising the steps of:
   providing an actuator having a single actuator housing containing within it a motor, a controller, a memory, a position sensor having an output, and a user interface for causing a first threshold value to be stored in said memory;
   receiving a signal over said user interface;
   storing a threshold value in said memory;
   reading a position sensor output;
   calculating a current position value, said position value being a function of said position sensor output; and
   preventing said motor from moving as a function of said current position value and said threshold value stored in said memory.

21. The method of controlling an actuator as set forth in claim 20, wherein said step of preventing a motor from moving comprises the step of stopping said motor when said current position value is greater than said first threshold.

22. The method of controlling an actuator as set forth in claim 20, and further comprising the step of storing a second threshold value in said memory, and wherein said step of preventing a motor from moving comprises the step of stopping said motor when said current position value is greater than said first threshold or less than said second threshold.

23. The method of controlling an actuator as set forth in claim 20, wherein said user interface comprises a switch having a current state, said current state one state out of a set of multiple possible states, and wherein said step of receiving a signal comprises the step of sensing a change of said current state.

24. The method of controlling an actuator as set forth in claim 20, wherein said step of storing a threshold value comprises the steps of calculating a current position value that is a function of said position sensor output; and storing said current position value into said memory.

25. The method of controlling an actuator as set forth in claim 20, and further comprising the step of setting said threshold value with an external programmer.

26. The method of controlling an actuator as set forth in claim 20, wherein said actuator housing further contains within it a brake, said brake configured and arranged to prevent said motor from moving when said brake does not receive an electrical power, and allow said motor to move when said brake receives an electrical power.

27. The method of controlling an actuator as set forth in claim 26, and further comprising the step of providing said brake an electrical power for disengaging said brake as a function of said current position value and said threshold value stored in said memory.

28. The method of controlling an actuator as set forth in claim 27, wherein said step of preventing said motor from moving comprises the step of cutting said electrical power for disengaging said brake.

* * * * *